United States Patent [19]
Kurita

[11] Patent Number: 5,831,958
[45] Date of Patent: *Nov. 3, 1998

[54] RECORDING AND/OR REPRODUCING APPARATUS FOR A CARTRIDGE ACCOMMODATING A RECORDING MEDIUM AND AN EJECT MECHANISM THEREOF

[75] Inventor: Kazuhito Kurita, Kanagawa, Japan

[73] Assignee: Sony Corporation, Tokyo, Japan

[ * ] Notice: The term of this patent shall not extend beyond the expiration date of Pat. No. 5,659,530.

[21] Appl. No.: 829,829

[22] Filed: Mar. 25, 1997

Related U.S. Application Data

[63] Continuation of Ser. No. 306,656, Sep. 15, 1994, Pat. No. 5,659,530.

[30] Foreign Application Priority Data

Sep. 20, 1993 [JP] Japan ................................. 5-233618

[51] Int. Cl.⁶ .................................................. G11B 17/04
[52] U.S. Cl. ...................................... 369/772; 360/99.06
[58] Field of Search .............................. 360/96.5, 99.02, 360/99.03, 99.06, 99.07; 369/75.2, 77.2, 13

[56] References Cited

U.S. PATENT DOCUMENTS

| | | | |
|---|---|---|---|
| 4,686,594 | 8/1987 | Kurafuji | 360/99.02 |
| 4,750,063 | 6/1988 | Kume et al. | 360/99 |
| 4,887,174 | 12/1989 | Tezuka | 360/99.06 |
| 5,142,522 | 8/1992 | Muramatsu et al. | 369/75.2 |
| 5,224,079 | 6/1993 | Inoue | 369/13 |
| 5,329,504 | 7/1994 | Mukawa | 369/13 |
| 5,341,357 | 8/1994 | Mukawa et al. | 369/75.2 |
| 5,355,357 | 10/1994 | Yamamori et al. | 369/77.2 |
| 5,537,377 | 7/1996 | Takai et al. | 360/99.06 |
| 5,583,834 | 12/1996 | Kanada et al. | 369/13 |
| 5,659,530 | 8/1997 | Kurita | 369/77.2 |

FOREIGN PATENT DOCUMENTS

| | | |
|---|---|---|
| 0 547 944 A2 | 6/1993 | European Pat. Off. . |
| 0 554 065 A2 | 8/1993 | European Pat. Off. . |
| 0 592 192 A2 | 4/1994 | European Pat. Off. . |
| 610 119 64 | 1/1986 | Japan . |

*Primary Examiner*—Brian E. Miller
*Attorney, Agent, or Firm*—Limbach & Limbach L.L.P.

[57] ABSTRACT

An eject mechanism of a recording and/or reproducing apparatus using a cartridge accommodating a recording medium, such as a disc cartridge, which includes a cartridge holder, an eject lever and a lock mechanism. The cartridge holder is attached to a base member so as to become rotatable between a first position and a second position lower than the first position. The cartridge holder loads and holds the cartridge inserted therein. The eject lever is attached to the cartridge holder so that it can be freely moved. The eject lever is engaged with the cartridge inserted into the cartridge holder and moved in unison with the inserted cartridge. The lock mechanism restricts the eject lever from moving in a disc cartridge eject direction under the condition that insertion of the cartridge into the cartridge holder is finished and releases a restricted movement of the eject lever in the disc cartridge eject direction when the cartridge holder is rotated from the second position to the first position.

3 Claims, 16 Drawing Sheets

RECORDING AND/OR REPRODUCING APPARATUS FOR A CARTRIDGE ACCOMMODATING A RECORDING MEDIUM AND AN EJECT MECHANISM THEREOF

This is a continuation of Ser. No. 08/306,656, filed Sep. 15, 1994, now U.S. Pat. No. 5,659,530.

BACKGROUND

1. Field of the Invention

The present invention relates to a recording and/or reproducing apparatus using a cartridge in which a recording medium is accommodated and an eject mechanism thereof. More particularly, this invention relates to a recording and/or reproducing apparatus using a cartridge accommodating a recording medium having a holder for holding an inserted cartridge and an eject mechanism thereof.

2. Background of the Invention

Disc players having a disc cartridge in which an optical disc is accommodated as a recording medium, for example, loaded thereon to reproduce and/or record the disc are roughly classified as two kinds of systems, i.e., one system in which a disc player body has an openable and closable lid through which a disc cartridge is loaded and/or ejected, and another system called a front loading system in which a disc cartridge is loaded onto and/or ejected from an insertion mouth formed on the front wall of the disc player body.

Of the various types of disc players, small portable and thin disc players adopt the former system to load and/or eject the disc cartridge by opening and/or closing the openable and closable lid in order to simplify its mechanism.

If the portable disc players of the above-mentioned systems are designed so as to eject the disc cartridge, then it becomes very convenient for the user to take the disc cartridge from the disc player body with ease. However, the portable disc players are too small to afford a sufficient space in which the eject mechanism is provided. On the other hand, the disc players of front loading systems are adapted to eject the disc cartridge by electric driving power. Such front loading systems, however, cannot be applied to the portable disc players.

For this reason, it is not easy for the user to eject the disc cartridge from the portable disc player and the portable disc players are not easy to handle.

SUMMARY OF THE INVENTION

It is, therefore, an object of the present invention to provide an eject mechanism of a cartridge having a recording medium accommodated therein in which the above-mentioned problems can be solved.

It is another object of the present invention to provide a recording and/or reproducing apparatus using a cartridge accommodating therein a recording medium in which the above-mentioned problems can be solved.

According to the present invention, there is provided an eject mechanism of a cartridge accommodating therein a recording medium which includes a cartridge holder, an eject operation member and a lock mechanism. The cartridge holder is attached to a base member so as to become rotatable between a first position and a second position lower than the first position. The cartridge holder loads thereunto the cartridge and holds the inserted cartridge. The eject operation member is attached to the cartridge holder so that it can be freely moved. The eject operation member is engaged with the cartridge inserted into the cartridge holder and moved in unison with the inserted cartridge. The lock mechanism restricts the eject operation member from moving in a disc cartridge eject direction when insertion of the cartridge into the cartridge holder is finished. the lock mechanism releases a restricted movement of the eject operation member in the disc cartridge eject direction when the cartridge holder is rotated from the second position to the first position.

According to the present invention, there is provided a recording and/or reproducing apparatus using a cartridge accommodating therein a recording medium which includes a base member, a cartridge holder, an eject lever and a lock mechanism. The base member includes a recording medium with a recording and/or reproducing portion disposed thereon. The cartridge holder is attached to the base member so as to become rotatable between a first position and a second position lower than the first position. The cartridge holder loads a cartridge and holds the cartridge inserted therein. The cartridge holder includes a major wall portion of substantially square configuration, a pair of side wall portions formed along a pair of opposed sides of the major wall portion and a pair of holding portions projected from the pair of side wall portions into the cartridge holder so as to become parallel to the major wall portion and to hold the cartridge inserted thereto. The eject lever is engaged with the cartridge inserted into the cartridge holder and moved in unison with the inserted cartridge. The lock mechanism restricts the eject lever from moving in a disc cartridge eject direction when insertion of the cartridge into the cartridge holder is finished, and releases a restricted movement of the eject lever in the disc cartridge eject direction when the cartridge holder is rotated from the second position to the first position. The eject lever is attached to one of the pair of side wall portions of the cartridge holder such that the eject lever can freely be moved along the direction in which the cartridge is inserted into, and ejected from, the cartridge holder. The lock mechanism is disposed on one of the pair of side wall portions along a side wall to which the eject lever is attached.

According to the present invention, since the eject mechanism for the cartridge in which the recording medium is accommodated can be simplified in structure, it is possible to make the eject mechanism small and thin. Also, it is possible to make the recording and/or reproducing apparatus using the above-mentioned eject mechanism small and thin.

DESCRIPTION OF THE INVENTION

A recording and/or reproducing apparatus using a cartridge accommodating therein a recording medium and an eject mechanism thereof according to the present invention will hereinafter be described with reference to the drawings. In the following embodiment, the case where an optical disc is used as a recording medium and a disc cartridge is used as a cartridge will be described.

Figure 1:
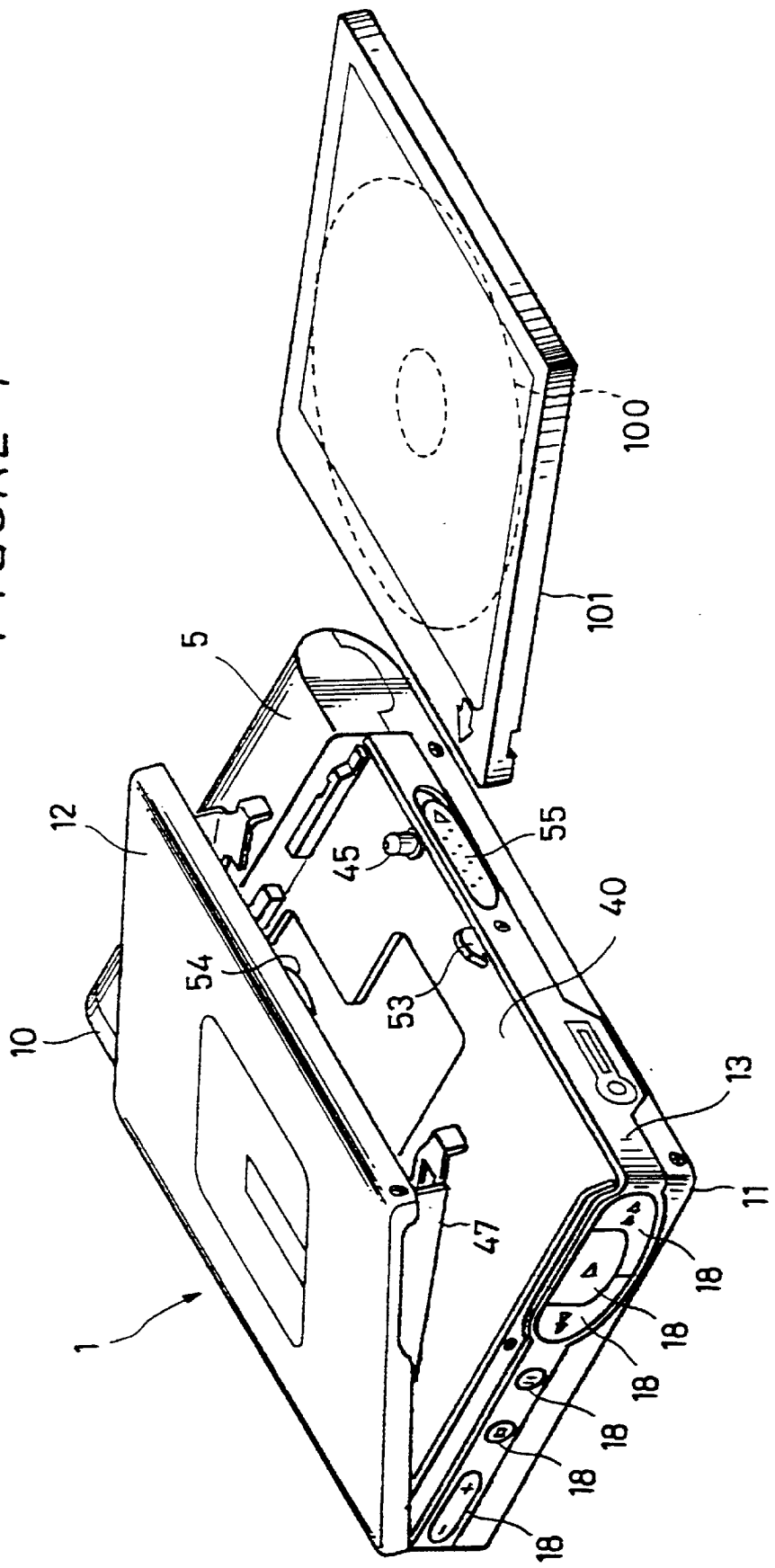
FIG. 1 is a perspective view of a disc player according to an embodiment of the present invention.

FIG. 1 of the accompanying drawings is a perspective view showing an outer face of a disc player 1 which will be described below as a recording and/or reproducing apparatus according to the embodiment of the present invention. As shown in FIG. 1, a magneto-optical disc or optical disc 100 hereinafter simply referred to as a disc) having a diameter of approximately 64 mm that is loaded on the disc player 1 is accommodated within a cartridge (hereinafter referred to as a disc cartridge) 101 made of a plastic material so the disc 100 is rotatable. A signal, i.e., a signal representing a piece of music or the like, is already recorded on the optical disc 100. The disc cartridge 101 in which the disc 100 is accommodated is loaded onto the disc player 1 and thereby the disc 100 is reproduced.

This disc player 1 is made smaller and thinner as compared with disc players of the same kind because the disc player 1 is designed with a great stress on portability. The disc player 1 is of a ultra-thin type and has a thickness of 18.5 mm.

The structure that allows the disc player 1 to become small and thin will be described with reference to FIGS. 2 to 4.

Figure 2:
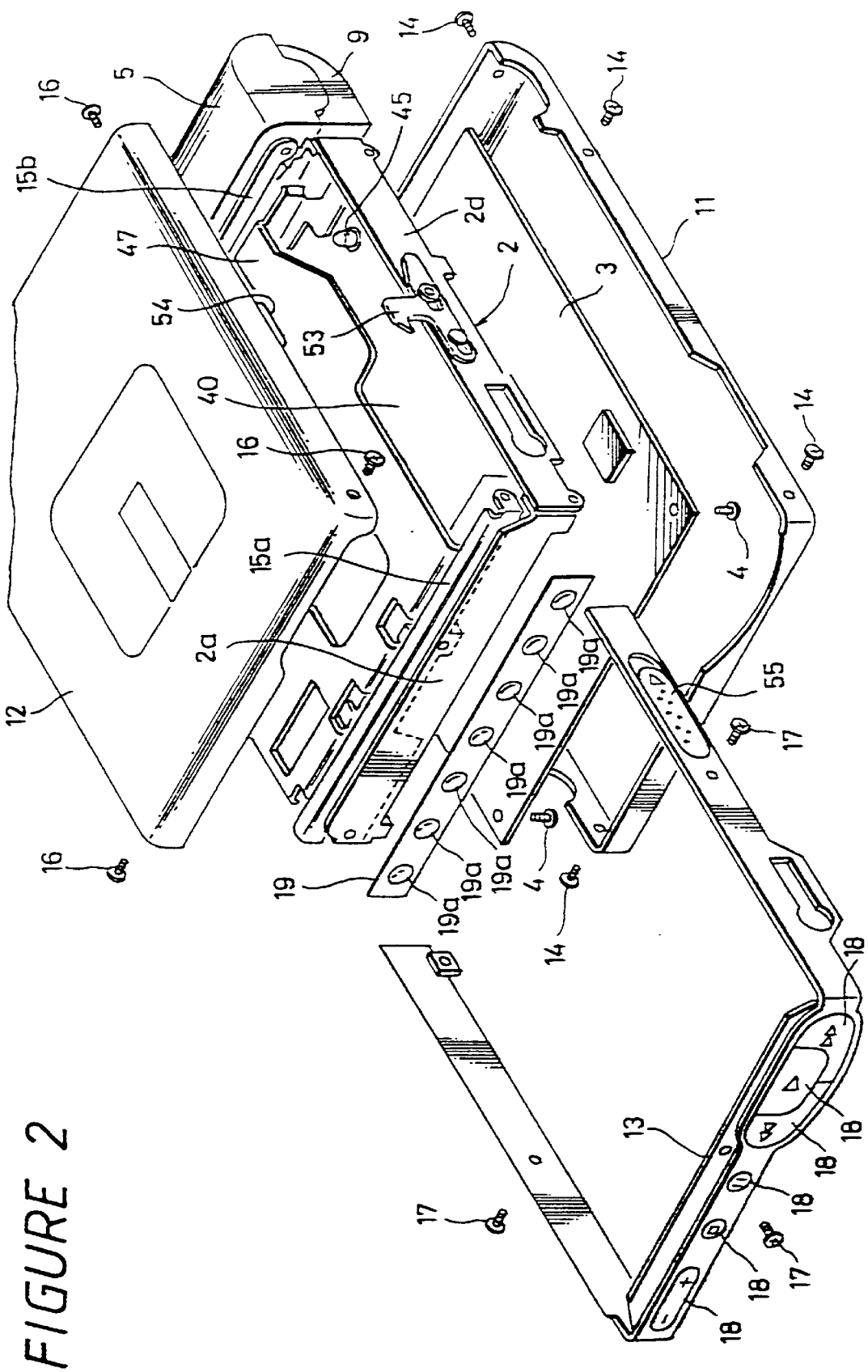
FIG. 2 is an exploded perspective view of the disc player according to the embodiment of the present invention.
Figure 3:
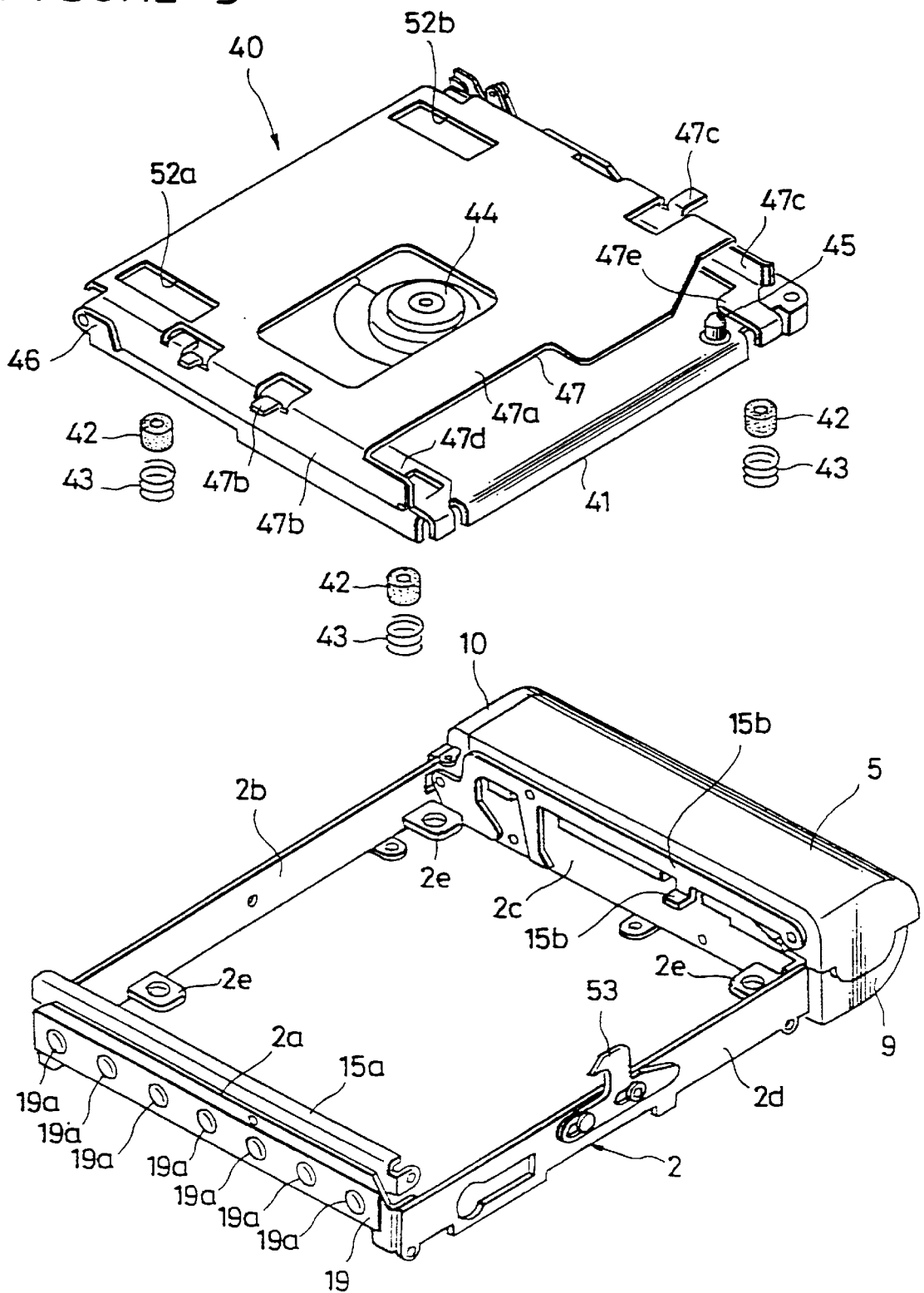
FIG. 3 is an exploded perspective view of a chassis and a disc drive mechanism portion of the disc player according to the embodiment of the present invention.
Figure 4:
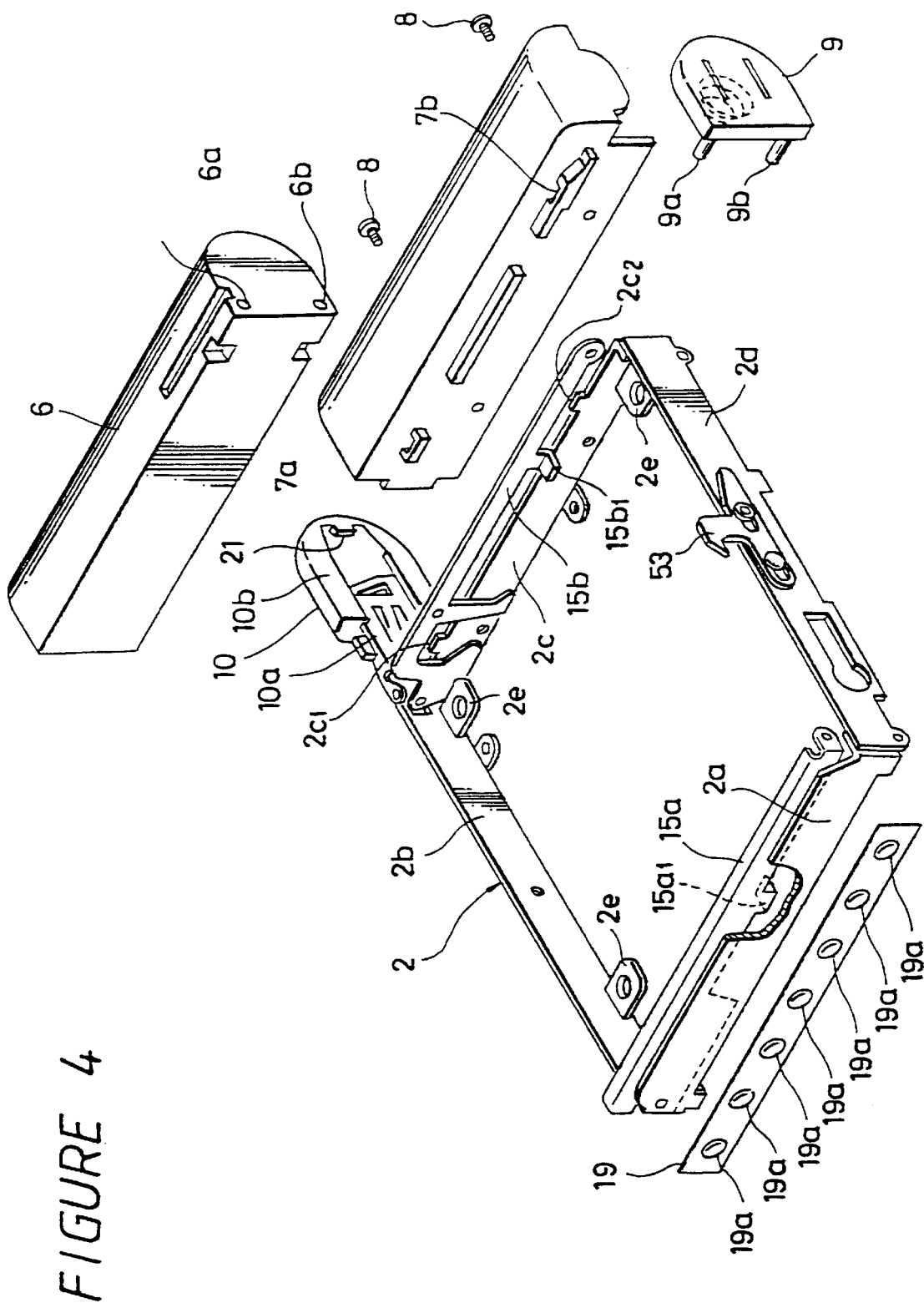
FIG. 4 is an exploded perspective view of the chassis and a battery case portion of the disc player according to the embodiment of the present invention.

In FIGS. 2 to 4, reference numeral 2 designates a main chassis (hereinafter simply referred to as a chassis) which serves as a fundamental framework of the disc player 1. As shown in FIGS. 3 and 4, the chassis 2 is of a frame which comprises four side wall portions, i.e., a left side wall portion 2a, a rear side wall portion 2b, a right side wall portion 2c and a front side wall portion 2d, each composed of a thin sheet metal.

The left side wall portion 2a, the rear side wall portion 2b, and the right side wall portion 2c of the chassis 2 are formed by bending a sheet metal in a U-shaped fashion to which a sheet metal forming the front side wall portion 2d is fixed, thereby forming the frame-shaped chassis 2 having four walls.

A disc drive mechanism portion 40 on which the disc cartridge 101 is loaded is accommodated within the chassis 2. The disc drive mechanism portion 40 will be described more fully later on.

A circuit board 3, on which a disc drive circuit and a signal reproducing circuit (not shown) is attached to the lower surface of the chassis 2 by screws.

Reference numeral 5 denotes a battery case which houses a battery 6 as a power supply of the disc player 1. The battery case 5 is made of a rigid material molded by zinc die casting, for example. The battery case 5 is attached to the right side wall portion 2c of the chassis 2.

A structure in which the battery case 5 and the chassis 2 are secured to each other will be described more in detail with reference to FIG. 4. Projected portions 2c1, 2c2 are projected from the upper edge of the right side wall portion 2c of the chassis 2. On the other hand, vertically elongated engagement apertures 7a, 7b are formed on the side wall of the battery case 5 in association with the projected portions 2c1, 2c2. The projected portions 2c1, 2c2 of the chassis 2 are upwardly engaged into the engagement apertures 7a, 7b. Then, the right side wall portion 2c of the chassis 2 and the battery case 5 are fastened together by screws 8 in the direction perpendicular to the direction in which the projected portions 2c1, 2c2 are engaged into the engagement apertures 7a, 7b.

Because the battery case 5 is made of a rigid material and is fixed to the right side wall portion 2c of the chassis 2 which is formed as a frame by bending the thin sheet metal, strength of the chassis 2 can be considerably increased as compared with the case that the chassis 2 is not provided with the battery case 5.

The battery 6 that is accommodated into the battery case 5 as the operation power supply is an exclusively-prepared battery of rechargeable type. The disc drive mechanism portion 40 and electronic circuits on the circuit board 3 are energized by contacting electrodes 6a, 6b formed on one end face of the battery terminals 9a, 9b of an input base plate 9 disposed within the battery case 5.

An opening portion of the battery case 5 through which the battery 6 is loaded or unloaded is opened and/or closed by a battery lid 10 which is pivotally supported to the chassis 2 in the horizontal direction. A structure of the battery lid 10 will be described later on.

The chassis 2, whose strength is increased by fixing the battery case 5 made of the rigid material thereto, is covered with a lower lid 11, an upper lid 12 and a panel frame 13 that forms the housing of the disc player 1.

The lower lid 11 is made of an aluminum plate and is of such a size as to cover the lower surface of the chassis 2 to the lower surface of the battery case 5. The lower lid 11 is fixed to the chassis 2 and the battery case 5 by screws 14.

The chassis 2 includes on its rear portion a pivotally supported pair of arms 15a, 15b each made of a sheet metal so that the pair of arms 15a, 15b can be rotated in the vertical direction (upper and lower direction). The upper lid 12 that is formed of the aluminum plate so as to cover the upper surface of the chassis 2 is secured to the pair of arms 15a, 15b by screws 16. Specifically, the upper lid 12 can be rotated in the upper and lower direction relative to the chassis 2 and arranged as an openable and/or closable lid which opens and/or closes the disc cartridge loading portion of the disc drive mechanism portion 40.

The panel frame 13 disposed between the lower lid 11 and the upper lid 12 is a U-shaped frame made of a hard plastic material so that the panel frame 13 can be extended along the left side wall portion 2a, the rear side wall portion 2b and the front side wall portion 2d of the chassis 2. The panel frame 13 is fixed to the outer peripheral surface of the chassis 2 by screws 17.

The panel frame 13 includes, at its central wall portion facing to the left side wall portion 2a of the chassis 2, a variety of operation buttons 18, i.e., six kinds of operation buttons, such as PLAY, FAST FORWARD, REVERSE, PAUSE, STOP and VOLUME ADJUSTMENT of the disc player. Operation of the disc player is switched and the volume is adjusted by depressing touch-sensitive switches 19a fixed to the left side wall portion 2a of the chassis 2 with the respective operation buttons 18.

As described above, in the disc player 1 according to this embodiment, strength of the chassis 2 is increased by fixing the battery case 5 made of the rigid material to the frame-shaped chassis 2 made of the thin sheet metal. Further, the lower lid 11 made of aluminum is fixed across the chassis 2 and the battery case 5, and the upper lid 12 made of aluminum is attached to the upper surface of the chassis 2. Furthermore, the panel frame 13 made of the hard plastic material is fixed to the outer peripheral surface of the chassis 2. Consequently, according to the present invention, it is possible to construct the disc player which can generally be made small, thin and light and whose strength can be made sufficient in actual practice.

The structure according to this embodiment uses special structures for the pivot portion of the battery lid 10 that opens and/or closes the battery case 5 and the pivot portion of the upper lid 12 that opens and/or closes the disc loading portion in order to miniaturize the disc player.

These structure portions will be described with reference to FIG. 5.

Figure 5:
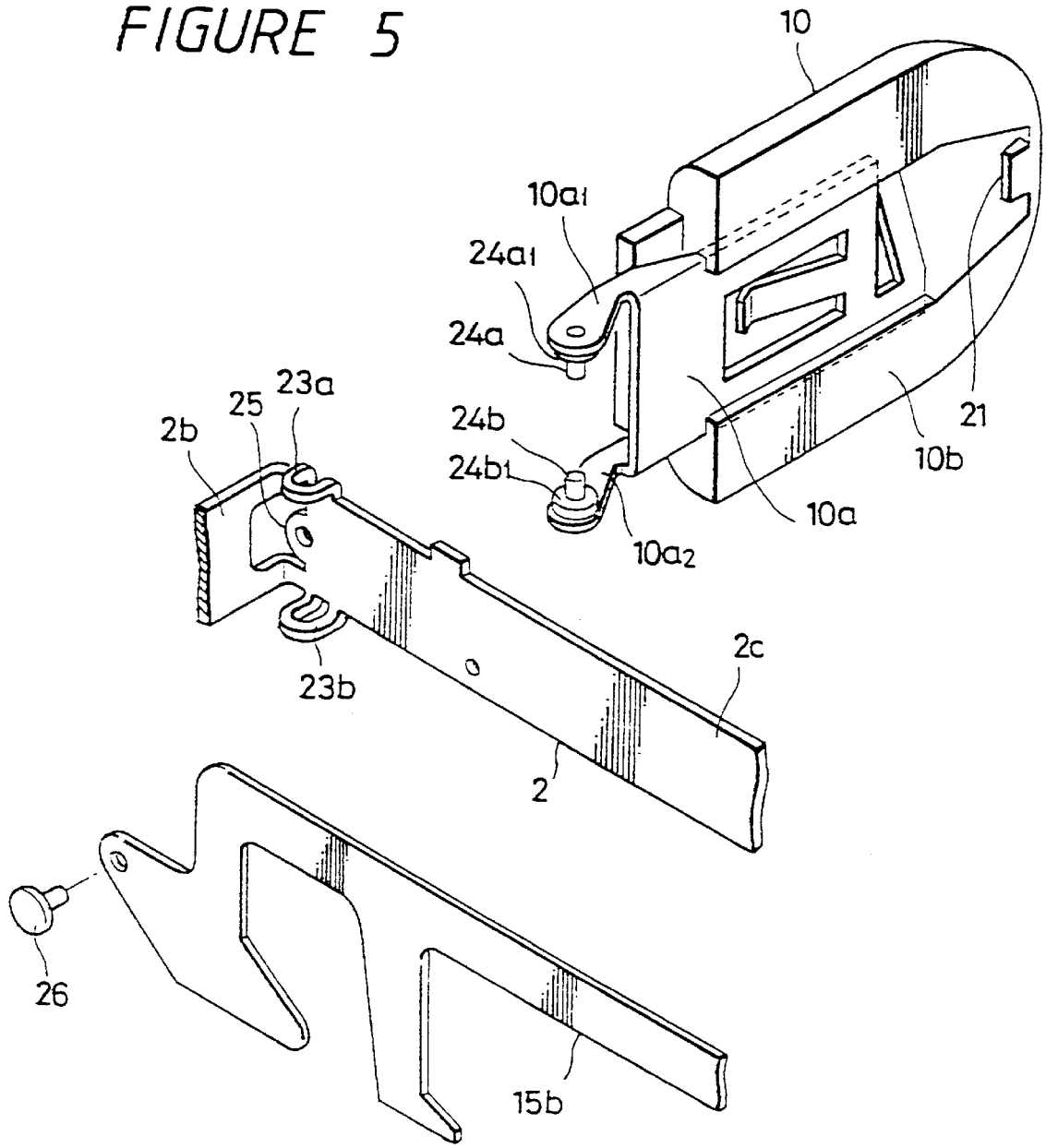
FIG. 5 is an exploded perspective view of a battery lid and a pivot portion of an upper lid of the disc player according to the embodiment of the present invention.

As shown in FIG. 5, the battery lid 10 comprises a rotating plate 10a pivotally supported to the chassis 2 so as to open and/or close the opening portion of the battery case 5 and a lid body 10b attached to the rotating plate 10a so as to become slidable along the surface direction of the rotating plate 10a in a predetermined range.

Figure 6:
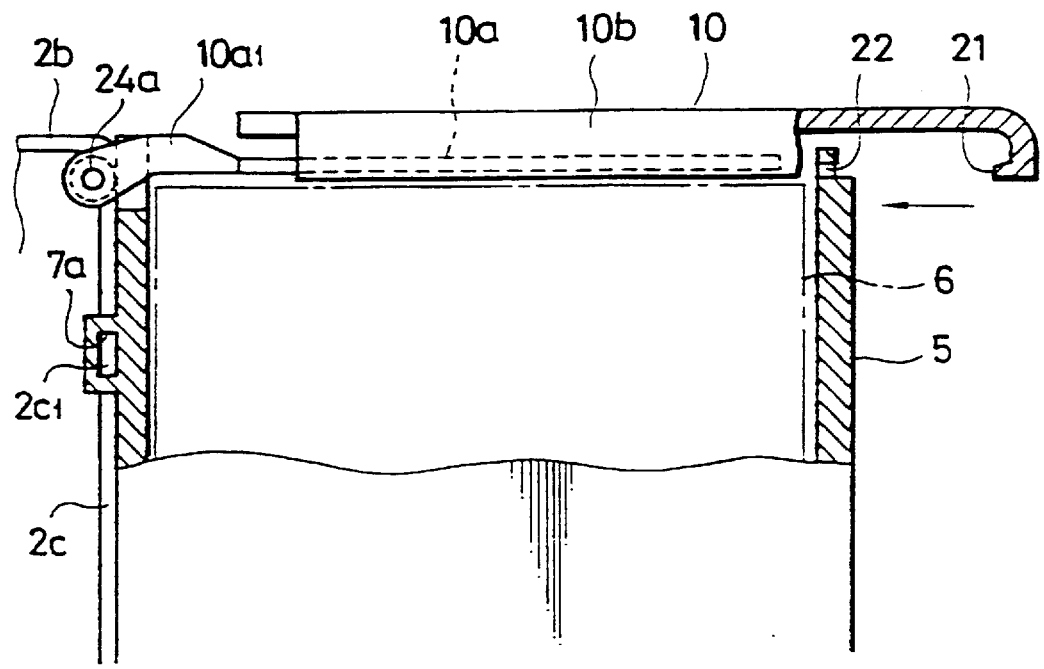
FIG. 6 is a plan view, partly in cross-sectional form, of the battery lid of the disc player according to the embodiment of the present invention.

The lid body 10b includes an engagement protrusion 21 formed at the tip end portion thereof. On the other hand, the battery case 5 includes at its opening edge an engagement aperture 22 as shown in FIG. 6. The battery lid 10 closes the opening portion of the battery case 5 under the condition that the lid body 10b is moved to the free end portion side of the rotating plate 10a. Then, the battery lid 10 is locked by engaging the engagement protrusion 21 with the engagement aperture 22 after the lid body 10b was moved to the base end portion side of the rotating plate 10a from this state.

The pivot portion of the thus arranged battery lid 10 relative to the chassis 2 is provided at substantially the same portion as one pivot portion of the upper lid 12.

As shown in FIG. 5, first bearing portions 23a, 23b to which the battery lid 10 is pivotally supported are symmetrically formed on upper and lower edges of the right side wall portion 2c near the bent portion between the rear side wall portion 2b and the right side wall portion 2c of the chassis 2. A second bearing portion 25 that pivotally supports the right arm 15b to which the upper lid 12 is attached is formed between the upper and lower first bearing portions 23a and 23b.

Each of the first bearing portions 23a, 23b that pivotally supports the battery lid 10 is projected as a U-shaped member in which the base portion is erected vertically and the tip end portion is inwardly bent in the horizontal direction. In association therewith, upper and lower projected portions 10a1, 10a2 projected on the base end portion of the rotating plate 10a of the battery lid 10 include supporting shafts 24a, 24b projected therefrom in an opposing relation. The upper and lower supporting shafts 24a, 24b can be assembled with ease when the upper and lower supporting shafts 24a, 24b are inserted into and engaged with the first bearing portions 23a, 23b from the lateral direction.

Figure 7:
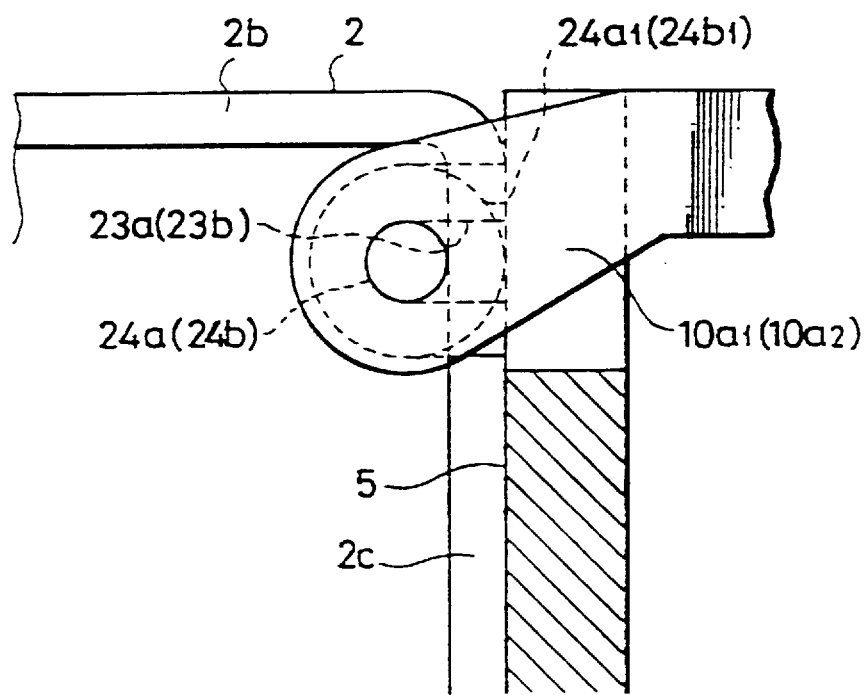
FIG. 7 is a plan view of the pivot portion of the battery lid of the disc player according to the embodiment of the present invention.

In this structure, flange portions 24a1, 24b 1 are respectively formed on the base portions of the supporting shafts 24a, 24b. When the battery case 5 is fixed to the right side wall portion 2c of the chassis 2 after the supporting shafts 24a, 24b are engaged with the first bearing portions 23a, 23b, the flange portions 24a1, 24b1 are brought in contact with one portion of the battery case 5. Thus, the battery lid 10 can be assembled accurately without wobbling under the condition that the supporting shafts 24a, 24b are prevented from being disengaged from the first bearing portions 23a, 23b (see FIG. 7).

The second bearing portion 25 that pivotally supports the arm 15b to which the upper lid 12 is attached is projected in an erected tab fashion between the first bearing portions 23a and 23b in the direction perpendicular to the first bearing portions 23a, 23b. The arm 15b is pivotally supported by a caulking pin 26 to the second bearing portion 25 so that the arm 15b can be rotated in the vertical direction.

According to the above-mentioned structure, the pivot portions of the battery lid 10 and the upper lid 11 have different rotating directions thus being efficiently disposed on the chassis 2 so space can effectively be used, thereby the disc player being miniaturized advantageously.

Further, in the disc player 1 according to this embodiment, there is considered a structure that the portions in which the operation buttons 18 are disposed on the panel frame 13 can maintain sufficient strength.

The structure of the panel frame 13 will be described with reference to FIGS. 8 and 9.

As illustrated, the panel frame 13 includes concave portions 27 corresponding to the operation buttons 18. The operation buttons 18 are properly disposed in the concave portion 27.

Each operation button 18 includes on its rear surface two kinds of pins 28, 29. The pins 28, 29 are faced to the inner surface of the panel frame 13 via through-holes 30, 31 bored on the bottom portion of the concave portion 27. Of the two kinds of pins 28, 29, one pin 28 is opposed to the touch-sensitive switch 19a of the switch base plate 19 fixed to the left side wall portion 2a of the chassis 2. Pin 29 is coupled to a plate spring 32 fixed to the inner side surface of the panel frame 13.

Figure 8:
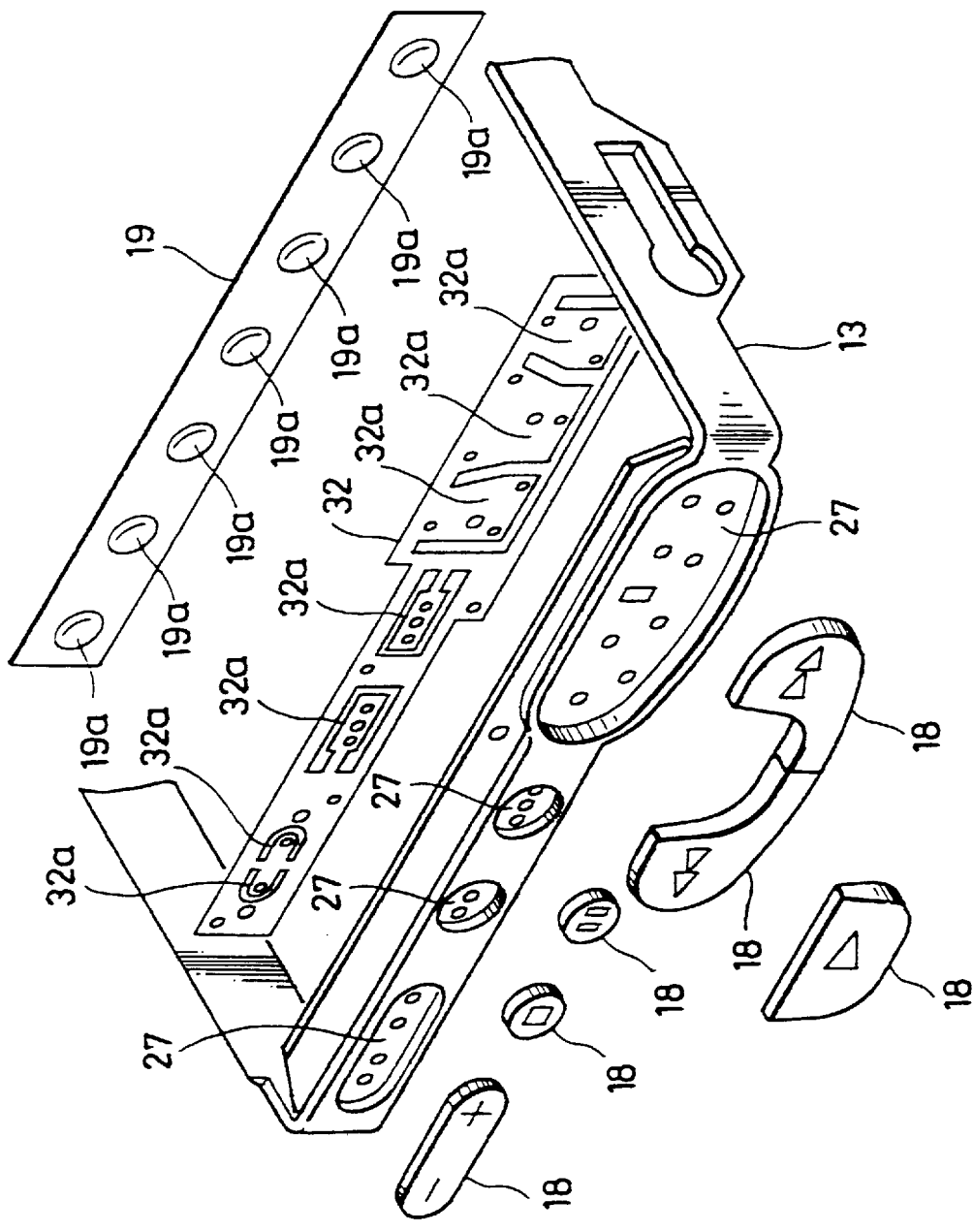
FIG. 8 is an exploded perspective view of a panel frame portion in which operation buttons are disposed.
Figure 9:
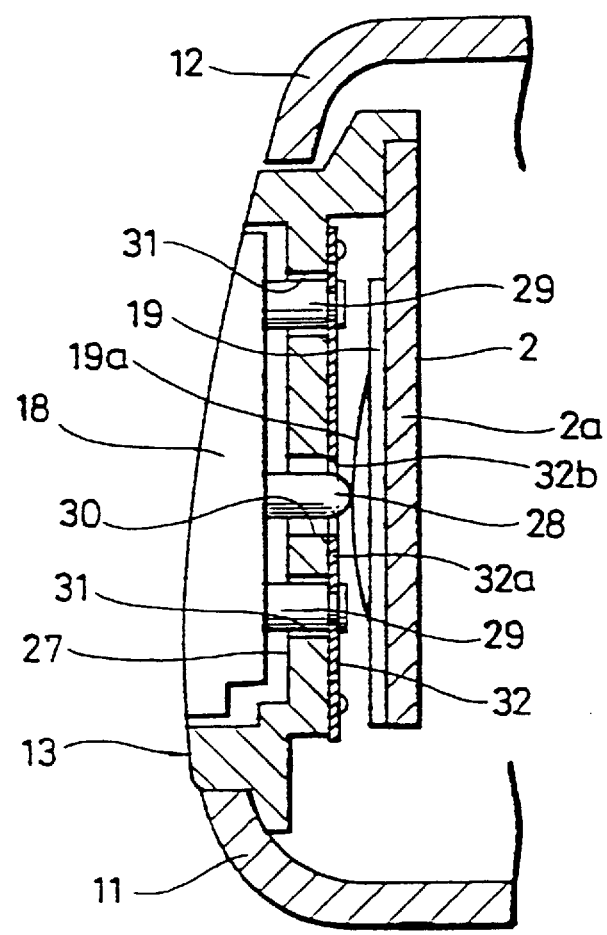
FIG. 9 is a longitudinal cross-sectional view of the panel frame portion in which the operation buttons are disposed.

As shown in FIG. 8, the plate spring 32 includes flexible portions 32a formed by predetermined slits in accordance with the respective operation buttons 18. The pin 29 of each operation button 18 is connected and fixed to the flexible portion 32a by melt-bonding caulking. Each operation button 18 is urged to return to the original state under spring force of the flexible portion 32a of the plate spring 32. Also, the pin 28 is brought in contact with the touch-sensitive switch 19a via a through-hole 32b bored through the plate spring 32.

When the operation button 18 is depressed against the spring force of the plate spring 32, the touch-sensitive switch 19a corresponding to the operation button 18 is energized and various operations of the disc, i.e., PLAY, FAST FORWARD, REVERSE, PAUSE, STOP are switched or volume is adjusted by VOLUME ADJUSTMENT.

With the above-mentioned arrangement, the panel frame 13 according to this embodiment can maintain sufficient strength as compared with the attachment structure of the ordinary operation button 18.

Specifically, in the ordinary structure, the panel frame 13 includes the through-holes through which the operation buttons 18 are entered. According to the embodiment of the present invention, since the strength of the panel frame 13 is considerably lowered at the lightening hole portions formed by the through-holes, the concave portion 27 is used as the disposed portion in which the operation buttons 18 are disposed on the panel frame 13, i.e., the fundamental important portions of the panel frame 13 are maintained, thereby making it possible to avoid the strength of the panel frame 13 from being lowered.

The strength of the panel frame 13 is sufficiently maintained, which can considerably contribute to the increase of the strength of the disc player 1 on the whole.

An arrangement of the disc drive mechanism portion 40 that is accommodated in the chassis 2 will be described with reference to FIGS. 3 and 11.

Figure 11:
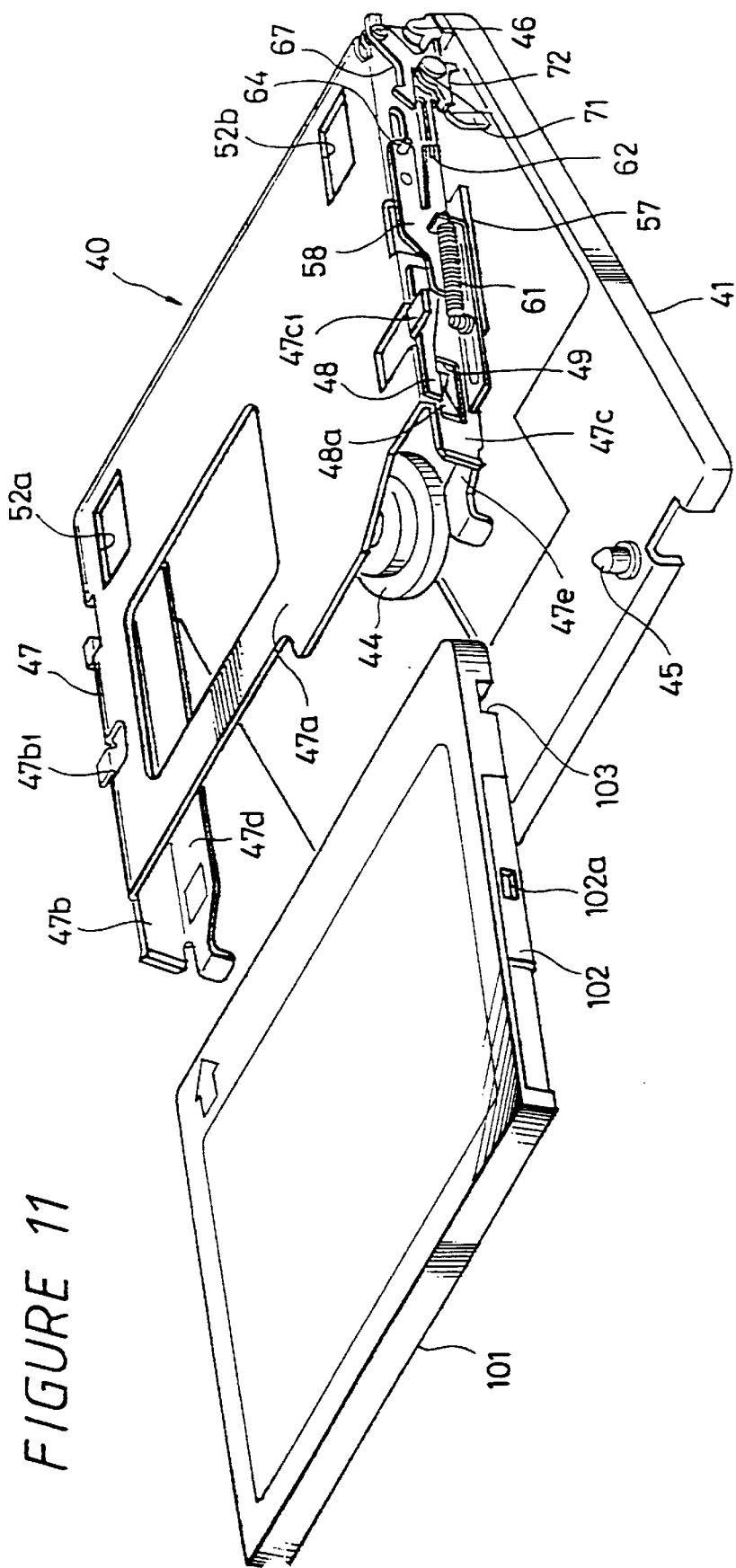
FIG. 11 is a perspective view of the disc drive mechanism portion of the disc player according to the embodiment of the present invention.

In FIGS. 3 and 11, reference numeral 41 depicts a mechanical chassis which serves as a base plate of the disc drive mechanism portion 40. The mechanical chassis 41 is supported by supporting members 2e projected from the inner surface side of the chassis 2 at a plurality of positions in the horizontal direction through a damping mechanism in a floating state. The damping mechanism is composed of a rubber damper 42 and a coil spring 43.

On the mechanical chassis 41 are disposed a turntable 44 on which the disc 100 is held and which is rotated by a spindle motor (not shown) and an optical pickup (not shown) for reading a signal from the disc 100. Reference numeral 45 depicts a positioning pin projected on the mechanical chassis 41. While only one positioning pin 45 is illustrated, there are provided a pair of positioning pins 45 in actual practice.

The mechanical chassis 41 includes at its bearing portion 46 formed at the rear end thereof a cartridge holder 47 for holding the disc cartridge 101 pivotally supported in the upper and lower direction.

The cartridge holder 47 comprises an upper surface plate portion 47a, two side plate portions 47b, 47c downwardly bent from the left and right sides of the upper surface plate portion 47a at a right angle, and lower supporting plate portions 47d, 47e projected from the inner lower ends of the two side plate portions 47b, 47c at a right angle which are integrally formed. The disc cartridge 101 is inserted into the cartridge holder 47 under the condition that the cartridge holder 47 is rotated with a predetermined angle relative to the mechanical chassis 41. Then, the cartridge holder 47 is downwardly rotated so as to overlap the mechanical chassis 41 from the above-mentioned state, whereby the disc cartridge 101 is loaded on the mechanical chassis 41 at its predetermined loading position. Specifically, at the same time when the disc cartridge 101 is properly positioned by engaging reference apertures formed on the lower surface of the disc cartridge 101 with the positioning pins 45, the disc 100 is held at its central portion exposed to the lower surface side of the disc cartridge 101 on the turntable 44.

The cartridge holder 47 includes on its right side plate portion 47c a shutter releasing member 80 projected to the inner portion of the cartridge holder 47 to release as slide shutter 102.

The cartridge holder 47 includes, on the outer surface side of the right side plate portion 47c thereof a shutter closing lid member 48. The shutter closing lid member 48 is formed of a sheet metal, and a convex portion 48a of the shutter closing lid member 48 is projected to the inner portion of the cartridge holder 47 via a through-hole 49 of the right side plate portion 47c of the cartridge holder 47.

When the disc cartridge 101 is inserted into the cartridge holder 47, the disc cartridge 101 is inserted into the cartridge holder 47 while the shutter 102 slides at its side surface along the convex portion 48a of the shutter closing lid member 48. When the disc cartridge 101 is inserted into the cartridge holder 47 up to its predetermined position, the convex portion 48a is engaged with the engagement aperture 102a of the shutter 102 and the shutter releasing member 80 is inserted into a groove formed on one side surface of the disc cartridge 101 and is thereby brought in contact with a shutter locking member (not shown) provided within the disc cartridge 101. Thus, the shutter releasing member 80 releases the shutter 102 from being locked by the shutter locking member and is brought in contact with the shutter 102. As a consequence, in accordance with the insertion of the disc cartridge 101, the shutter 102 is moved by the shutter releasing member 80 to expose a part of the disc 100 from the opening portion formed on the lower surface of the disc cartridge 101. Thus, a part of the disc 100 is opposed to an optical pickup (not shown).

When the disc cartridge 101 is ejected from the cartridge holder 47, owing to the action of the shutter closing lid member 48 engaged with the engagement aperture 102a of the shutter 102 when the disc cartridge 101 is inserted into the cartridge holder 47, the shutter 102 is closed as the disc cartridge 101 is ejected.

Although the rotation supporting point of the cartridge holder 47 and the rotation supporting point of the upper lid 12 are set at slightly displaced positions in the disc player 1 according to this embodiment, the cartridge holder 47 is rotated in unison with the opening and/or closing operation of the upper lid 12.

Specifically, the cartridge holder 47 includes projected portions 47b1, 47c1 projected from left and right side plate portions 47b, 47c in the horizontal direction. The left and right arms 15a, 15b to which the upper lid 12 is fixed include projected portions 15a1, 15b1 inwardly projected in the horizontal direction. The projected portions 15a1, 15b1 are opposed to the lower portions of the projected portions 47b1, 47c1 of the cartridge holder 47. When the upper lid 12 is opened, the projected portions 15a1, 15b1 of the arms 15a, 15b come in contact with the projected portions 47b1, 47c1 of the cartridge holder 47 to elevate the projected portions 47b1, 47c1. As a consequence, the cartridge holder 47 is rotated in the upper direction following the upper lid 12. Maximum opening angles of the upper lid 12 and the cartridge holder 47 are set to 25° and 20°, respectively.

Figure 10:
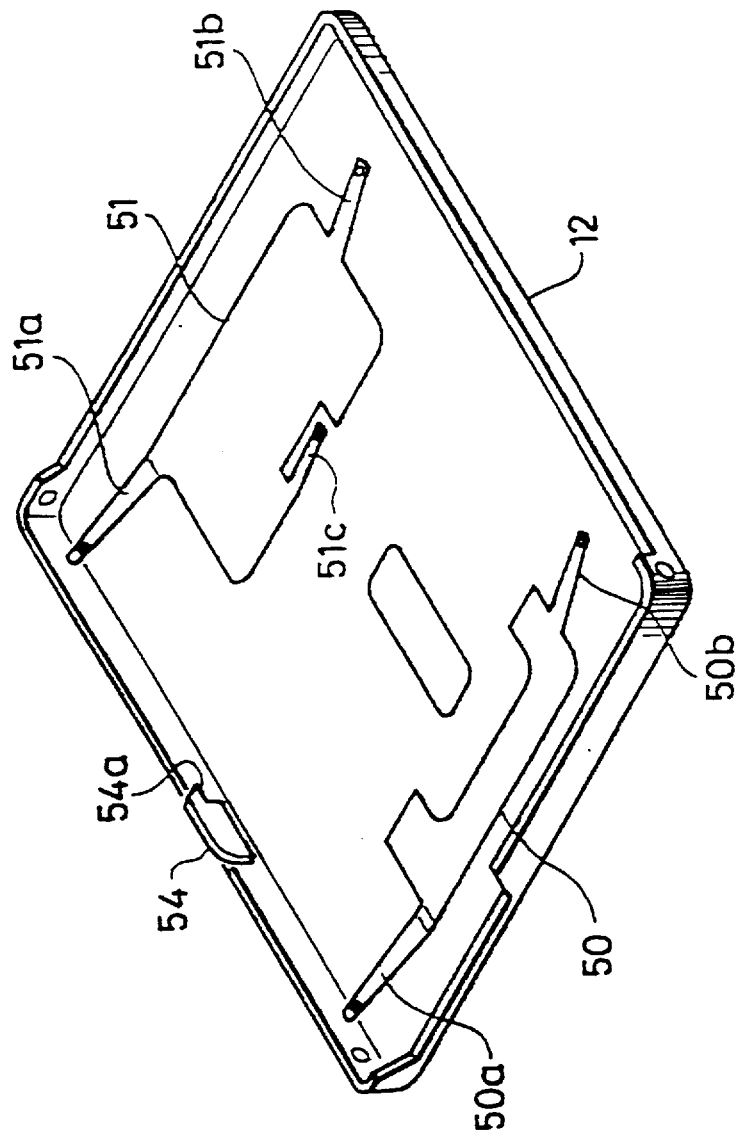
FIG. 10 is a perspective view showing the rear surface of the upper lid of the disc player according to the embodiment of the present invention.

The upper lid 12 includes left and right plate spring members 50, 51 fixed to its rear surface as shown in FIG. 10. The plate spring members 50, 51 include resilient projection portions 50a, 50b and 51a, 51b projected therefrom in the front and back direction. The right plate spring member 51 includes a resilient projection portion 51c projected at its central portion.

Any of the resilient projection portions 50a, 50b, 51a, 51b is bent with an inclination so that it is floated from the inner surface of the upper lid 12. When the upper lid 12 is closed, the resilient projection portion 51c of the right plate spring member 51 comes in contact with the upper surface plate portion 47a of the cartridge holder 47 to push the cartridge holder 47 in the lower direction. As a consequence, the cartridge holder 47 is rotated in the lower direction following the upper lid 12.

When the upper lid 12 is closed completely, the central resilient projection portion 51c of the right plate spring member 51 urges the cartridge holder 47 toward the mechanical chassis 41 and the resilient projection portions 50a, 50b and 51a, 51b of the two plate spring members 50, 51 urge the disc cartridge 101 toward the mechanical chassis 41. Thus, the disc cartridge 101 can be reliably loaded onto the disc cartridge loading portion on the mechanical chassis 41 without wobbling.

The front resilient projection portions 50a, 51a of the plate spring members 50, 51 are brought in contact with the disc cartridge 101 in front of the cartridge holder 47. On the other hand, the rear resilient projected portions 50b, 51b are brought in contact with the disc cartridge 101 through left and right through-holes 52a, 52b bored through the upper surface plate portion 47a of the cartridge holder 47.

The upper lid 12 is locked by a lock mechanism under the condition that it is closed completely, as illustrated in FIGS. 1–4. The lock mechanism comprises a hook-shaped lock member 53 provided on the center of the front side wall portion 2d of the chassis 2 and an engagement plate 54 fixed to the inner surface side of the front end of the upper lid 12 in response to the lock member 53. When the upper lid 12 is closed completely, the upper lid 12 is locked by engaging an engagement concave portion 54a (see FIG. 10) of the engagement plate 54 with the lock member 53.

When the upper lid 12 is released from the locked state, it is possible to open the upper lid 12 by sliding a lock release operation member 55 (see FIGS. 1–2) provided in the panel frame 13 to disengage the lock member 53 from the engagement plate 54.

When the upper lid 12 is released from the locked state and the upper lid 12 is opened, if the disc cartridge 101 is loaded in the cartridge holder 47, then the disc cartridge 101 is ejected from the cartridge holder 47.

An arrangement of an eject mechanism of this disc cartridge 101 will be described in detail with reference to FIG. 12.

Figure 12:
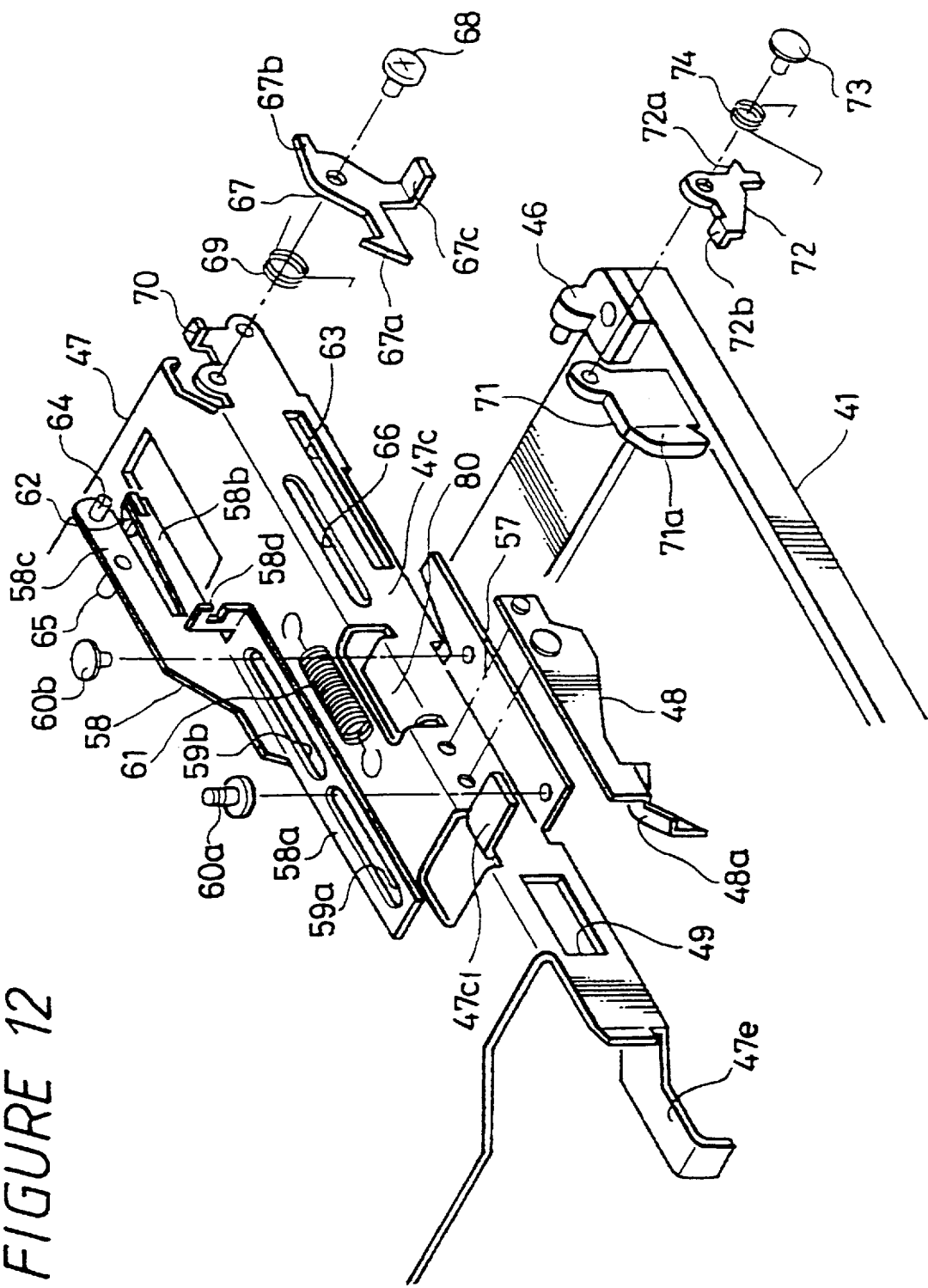
FIG. 12 is an exploded perspective view of an eject mechanism portion of the disc player according to the embodiment of the present invention.

As shown in FIG. 12, the cartridge holder 47 includes on its right side plate portion 47c unitarily formed a supporting plate portion 57 projected from the lower end to the horizontal direction. The supporting plate portion 57 includes an eject lever 58 formed of a sheet metal supported thereto so as to become slidable in the front and rear direction, i.e., in the same direction as the direction in which the disc cartridge 101 is loaded and/or ejected from the cartridge holder 47.

The eject lever 58 comprises a base plate portion 58a extended along the supporting plate portion 57 of the cartridge holder 47 and a resilient plate portion 58b and an extended plate portion 58c vertically erected from the front end portion of the base plate portion 58a along the right side plate portion 47c of the cartridge holder 47 which are integrally formed. Guide elliptic apertures 59a, 59b formed in the longitudinal direction of the base plate portion 58a are guided by guide pins 60a, 60b fixedly implanted on the supporting plate portion 57 of the cartridge holder 47 so that the eject lever 58 can be slid in a predetermined range in the front and back direction.

The base plate portion 58a of the eject lever 58 includes a spring stop protrusion 58d projected from the front end thereof. A tension coil spring 61 is extended between the spring stop protrusion 58d and the front guide pin 60a. The eject lever 58 is constantly biased in the forward direction, i.e. in the eject direction of the disc cartridge 101 under the spring force of the tension coil spring 61.

The resilient plate portion 58b of the eject lever 58 includes on its tip end portion formed an engagement tab 62 made of a resin to be engaged with a concave portion 103 formed on the side portion of the disc cartridge 101. The engagement tab 62 is integrally formed with the eject lever 58 of the sheet metal by outsert molding. The engagement tab 62 is opposed to the inside of the cartridge holder 47 via a though-hole 63 of a rectangular shape bored through the right side plate portion 47c of the cartridge holder 47. When the disc cartridge 101 is inserted into the cartridge holder 47, as shown in FIG. 13, the engagement tab 62 is in engagement with the concave portion 103 of the disc cartridge 101, whereby the eject lever 58 is slid in unison with the disc cartridge 101.

Figure 13:
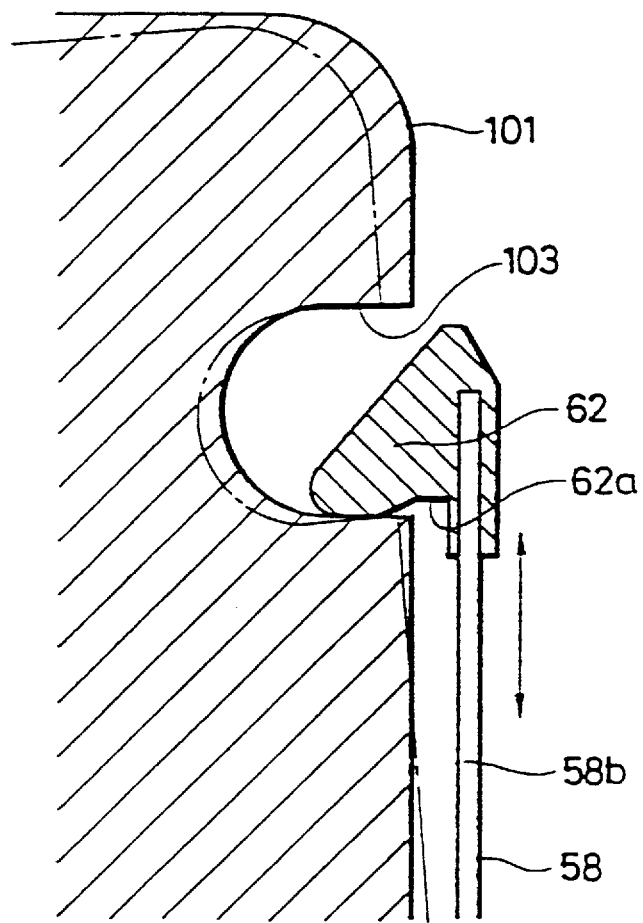
FIG. 13 is a diagram used to explain the engagement between an engagement tab of an eject lever of the eject mechanism and a concave portion of the disc cartridge.

The engagement tab 62 of the eject lever 58 includes, in particular, an undercut portion 62a as shown in FIG. 13. Specifically, the engagement tab 62 is undercut in concave shape at its root portion in which it is opposed to the concave portion 103 of the disc cartridge 101.

Because the engagement tab 61 has the undercut portion 62a, the engagement tab 62 can be easily and reliably engaged with the concave portion 103 of the disc cartridge 101. Therefore, even when the disc cartridge 101 is inserted into the cartridge holder 47 with a slight inclination due to wobbling within the cartridge holder 47 as shown by a one-dot phantom line in FIG. 13, the engagement tab 62 can be prevented from escaping from the concave portion 103. Thus, the engagement state between the engagement tab 62 and the concave portion 103 can be reliably maintained.

The eject lever 58 includes, on the outer surface tip end portion side of the extended plate portion 58c, a lock pin 64 that is engaged with a lock member 67 which will be described later on. Further, the extended plate portion 58c includes a guide pin 65 implanted on the inner surface side. The guide pin 65 is engaged with the rectangular guide opening 66 bored through the right side plate portion 47c of the cartridge holder 47 and is thereby guided so that the lock pin 64 is accurately opposed to and engaged with the lock member 67.

The lock member 67 is pivotally supported by a shaft pin 68 to the rear end portion of the right side plate portion 47c of the cartridge holder 47. The lock member 67 includes on its tip end portion a tab portion 67a that is engaged with the lock pin 64 of the eject lever 58.

The shaft pin 68 to which the lock member 67 is pivotally supported includes a torsion coil spring 69 mounted thereon. One end portion of the torsion coil spring 69 is engaged with the cartridge holder 47 side and the other end portion thereof is engaged with the lock member 67 side. Thus, the lock member 67 is constantly biased in the clockwise direction in FIG. 12 under spring force of the torsion coil spring 69.

The lock member 67 is locked at a predetermined rotational position, i.e., at the position in which the tab portion 67a is opposed to the lock pin 64 of the eject lever 58 when a part of the projected portion 67b comes in contact with a stopper projection 70 projected toward the cartridge holder 47 side.

The lock member 67 includes an operation member 67c that is used to release engagement between the lock member 67 and the lock pin 64. A lock releasing mechanism for operating the operation member 67c is disposed on the mechanical chassis 41 side.

The lock releasing mechanism, of a so-called ratchet mechanism, as described below releases engagement between the lock member 67 and the lock pin 64 by using the rotational operation of the cartridge holder 47.

In association with the lock member 67 of the cartridge holder 47 side, the mechanical chassis 41 includes a vertical wall 71 implanted in tab-shape in an opposing relation to the right side wall plate portion 47c of the cartridge holder 47. The vertical wall 71 includes a ratchet member 72 forming the ratchet mechanism pivotally supported thereto by a shaft pin 73. The ratchet member 72 includes on its one portion provided an action tab 72a opposing the operation member 67c of the lock member 67 and also includes on the other end portion thereof a stopper projection 72b.

A torsion coil spring 74 is attached to the shaft pin 73 to which the ratchet member 72 is pivotally supported. One end portion of the torsion coil spring 74 is engaged with the vertical wall 71 side and the other end portion thereof is engaged with the ratchet member 72 side. The ratchet member 72 is biased in the opposite direction of the lock member 67, i.e., in the counter-clockwise direction shown in FIG. 12 under the spring force of the torsion coil spring 74. The ratchet member 72 is locked at a predetermined rotational position, i.e., at the position in which the action tab 72a is opposed to the operation member 67c of the lock member 67 when the stopper member 72b comes in contact with the upper edge portion of the vertical wall 71.

The vertical wall 71 to which the ratchet member 72 is attached is inclined and bent such that a front portion 71a is opened toward the outside. Thus, the vertical wall 71 functions as a guide wall which can smoothly guide the eject lever 58 when the disc cartridge 101 is inserted into the cartridge holder 47.

Operation of the eject mechanism thus arranged will be described in detail below.

Figure 14:
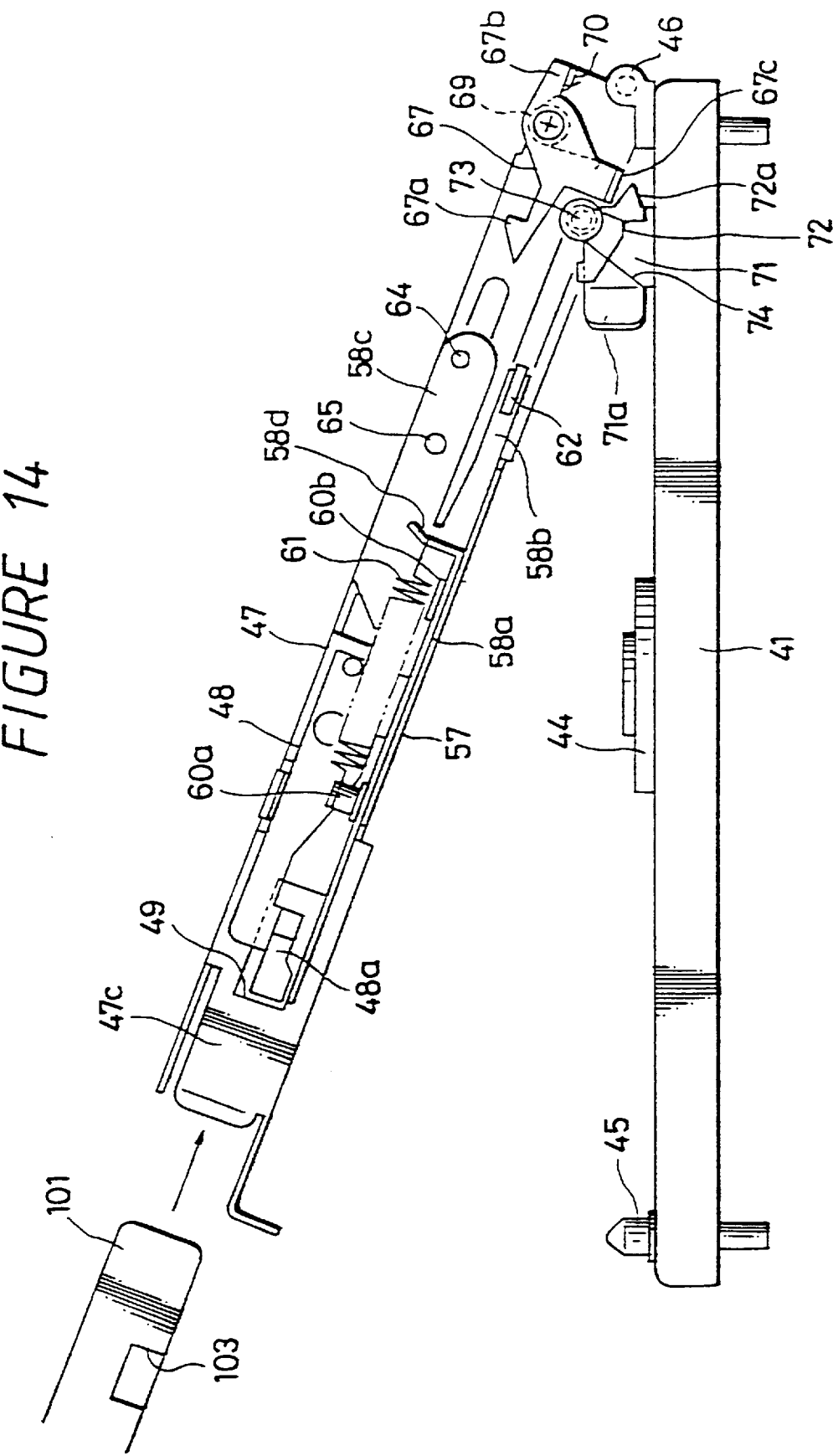
FIG. 14 is a side view used to explain the operation of the eject mechanism and illustrating the state where the disc cartridge is not yet inserted into the cartridge holder.

Initially, as shown in FIG. 14, when the disc cartridge 101 is inserted into the cartridge holder 47 under the condition that the cartridge holder 47 is elevated relative to the mechanical chassis 41, i.e., under the condition that the upper lid 12 is open, the engagement tab 62 of the eject lever 58 is engaged with the concave portion 103 of the side portion of the disc cartridge 101. As a result, the eject lever 58 is moved rearwardly in unison with the disc cartridge 101 against the spring force of the tension coil spring 61 at the same time when the disc cartridge 101 is moved.

At that time, engagement between the engagement tab 62 and the concave portion 103 is reliably maintained because the engagement tab 62 of the eject lever 58 includes the undercut portion 62a as described above. As a consequence, even when the disc cartridge 101 is inserted into the cartridge holder 47 with a small wobble, the engagement tab 62 can be prevented from being disengaged from the concave portion 103.

The resilient plate portion 58b of the eject lever 58 is guided by the vertical wall 71 of the lock releasing mechanism portion, thereby preventing the engagement tab 62 from being disengaged from the concave portion 103. Therefore, the eject lever 58 can reliably be moved in unison with the disc cartridge 101.

Figure 15:
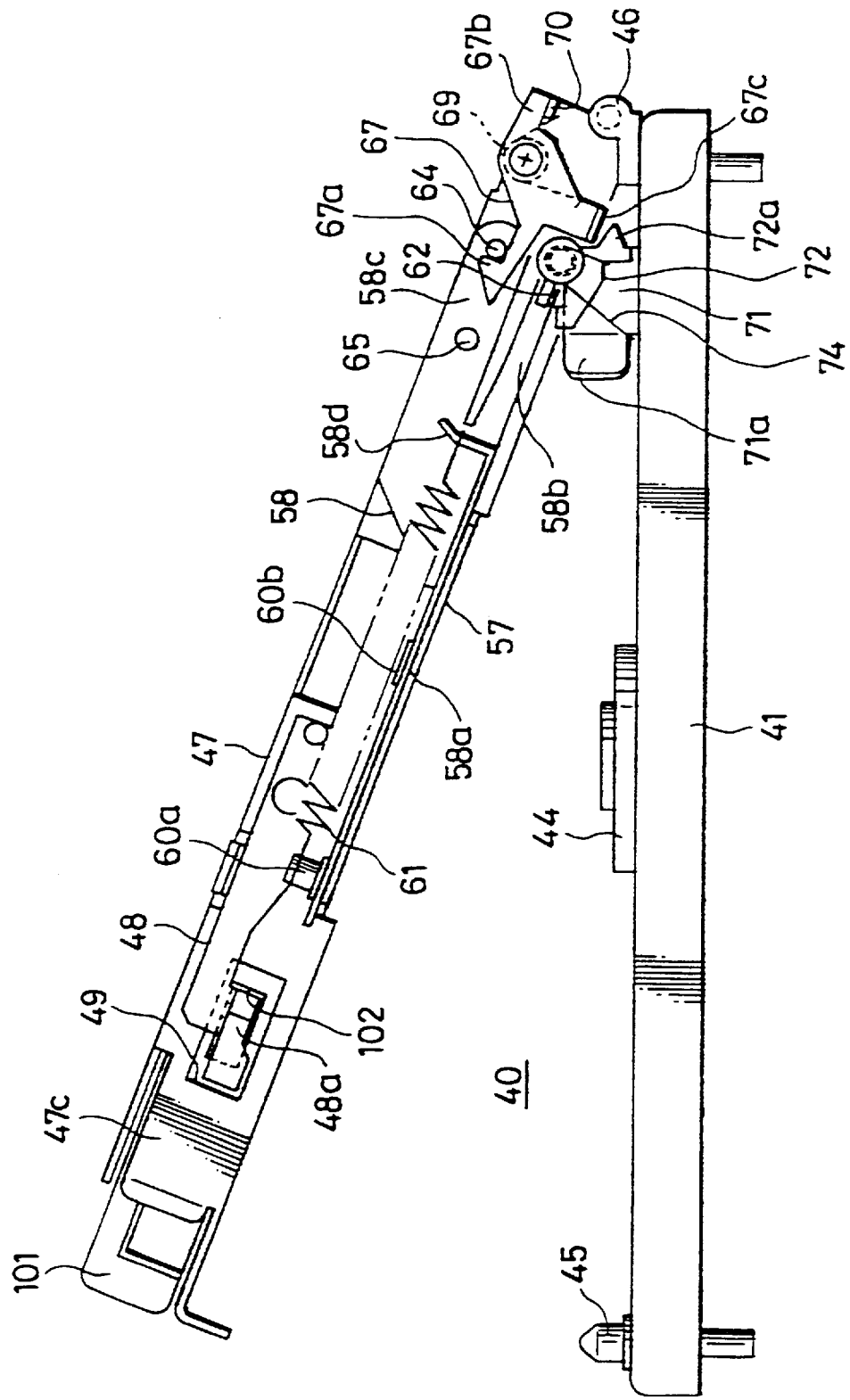
FIG. 15 is a side view used to explain the operation of the eject mechanism and illustrating the state where the disc cartridge is inserted into the cartridge holder.

When the disc cartridge 101 is inserted into the deepest portion of the cartridge holder 47 completely, as shown in FIG. 15, the lock pin 64 of the eject lever 58 is engaged with the tab portion 67a of the lock member 67, thereby locking the eject lever 58.

Engagement operation between the lock pin 64 and the lock member 67 will be described in more detail below.

Initially, when the eject lever 58 is moved in the rearward direction, the lock pin 64 contacts with and presses the tip end portion of the inclined edge of the tab portion 67a of the lock member 67. The lock member 67 is rotated by the pressing force of the lock pin 64 downwardly against the spring force of the torsion coil spring 69. Then, when the lock pin 64 passes the tab portion 67a, the lock member 67 is returned to the original position under spring force of the torsion coil spring 69, whereby the lock pin 64 is engaged with the tab portion 67a. Thus, the eject lever 58 is locked.

Figure 16:
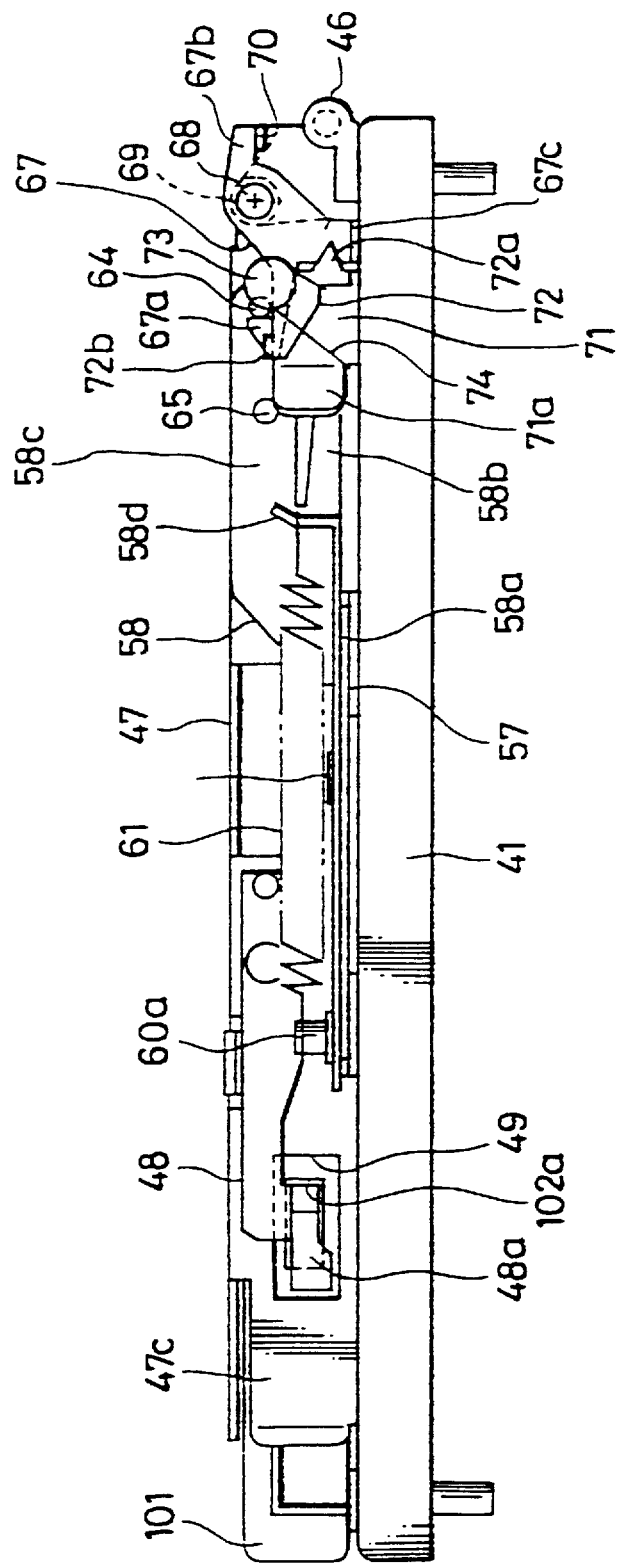
FIG. 16 is a side view used to explain the operation of the eject mechanism and illustrating the state where the disc cartridge is loaded onto a predetermined loading portion.

Then, the cartridge holder 47 is rotated in the lower direction by closing the upper lid 12 (from the state that the eject lever 58 is locked after the disc cartridge 101 is inserted into the cartridge holder 47 completely). When the disc cartridge 101 is loaded onto the disc cartridge loading portion provided on the mechanical chassis 41, as shown in FIG. 16, the operation member 67c of the lock member 67 passes the action tab 72a of the ratchet member 72 and placed under the action tab 72a.

The operation member 67c of the lock member 67 passes the action tab 72a of the ratchet member 72 as follows.

Because the lock member 67 is restricted by the stopper member 70 from rotating in the clockwise direction, the operation member 67c contacts with and presses the operation tab 72a of the ratchet member 72. By the pressing force of the operation member 67c, the ratchet member 72 is rotated in the clockwise direction, i.e., in the direction in which the action tab 72a is escaped from the operation member 67c of the lock member 67 against the spring force of the torsion coil spring 74. As a result, the operation member 67c of the lock member 67 passes the action tab 72a of the ratchet member 72.

Figure 17:
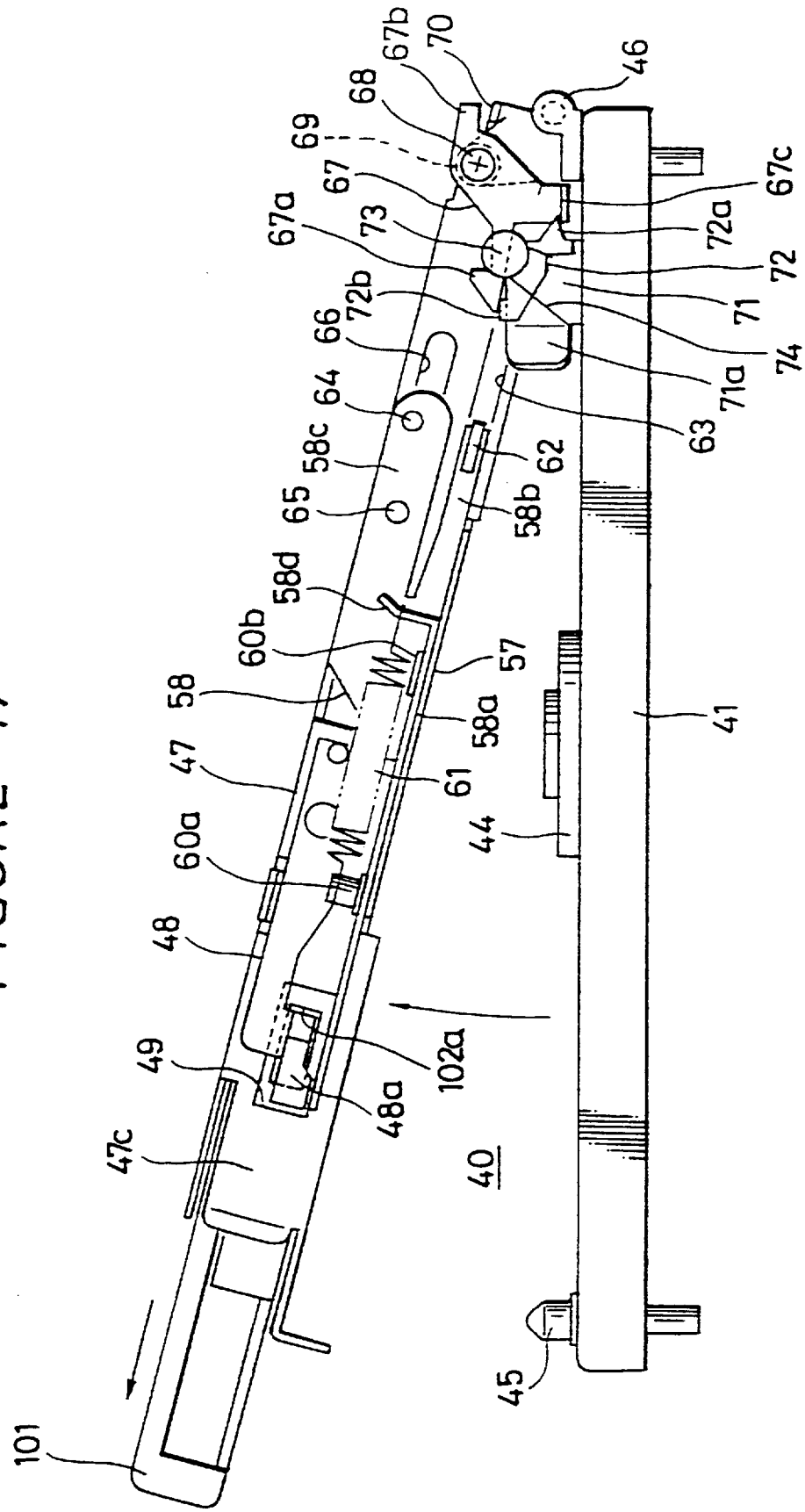
FIG. 17 is a side view used to explain the operation of the eject mechanism and illustrating the state where the disc cartridge was ejected from the cartridge holder.

When the cartridge holder 47 is rotated in the upper direction after the upper lid 12 was opened from this state as shown in FIG. 17, the ratchet member 72 is restricted by the stopper member 72b from rotating in the counter-clockwise direction. Therefore, when the operation member 67c of the lock member 67 comes in contact with the action tab 72a of the ratchet member 72, the lock member 67 is rotated in the counterclockwise direction relatively to the cartridge holder 47 against the spring force of the torsion coil spring 69.

Specifically, when the operation member 67c of the lock member 67 contacts with the action tab 72a of the ratchet member 72, the lock member 67 is left as it is while the cartridge holder 47 is rotated in the upper direction. Thus, the lock pin 64 is disengaged from the tab portion 67a of the lock member 67 and the lock member 67 is released from the locked state, whereby the eject lever 58 is moved in the forward direction and returned to the original position under spring force of the tension coil spring 61. As a result, the disc cartridge 101 is ejected from the cartridge holder 47 by the eject lever 58.

When the cartridge holder 47 is elevated up to the uppermost rotational position after the upper lid 12 was opened completely, the operation member 67c of the lock member 67 passes the action tab 72a of the ratchet member 72 so that the lock member 67 is returned to the original state.

The disc cartridge 101 is ejected from the cartridge holder 47 at the same time when the upper lid 12 is opened as described above. Therefore, the user can remove the disc cartridge 101 from the cartridge holder 47 with ease.

While the disc cartridge has been described so far with an optical disc accommodated therein as the recording medium, the present invention is not limited thereto, and may be applied to an eject mechanism of a tape cassette in which a magnetic tape is accommodated as a recording medium in the disc cartridge.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A recording and/or reproducing apparatus using a cartridge accommodating therein a recording medium, comprising:

a base member having a recording medium recording and/or reproducing portion disposed thereon;

a cartridge holder including:

a substantially square plate portion with opposing side edges and opposing front and rear edges, a pair of side walls depending from said pair of side edges, and a pair of holding portions projected from said pair of side walls toward each other and parallel to said plate portion, wherein said cartridge holder is rotatably attached to said base member about said rear edge between a first position and a second position lower than said first position, said cartridge holder for loading a cartridge in a cartridge insertion direction from said front edge to said rear edge and for holding said cartridge inserted therein;

an eject lever slidably mounted on one of said pair of side walls and engageable with said cartridge inserted into said cartridge holder, wherein said eject lever linearly slides in unison with said inserted cartridge in said cartridge insertion direction and a cartridge ejection direction; and a lock mechanism that restricts said eject lever from moving in said cartridge eject direction when said cartridge is inserted into said cartridge holder, and releases said restriction on movement of said eject lever in said cartridge eject direction when said cartridge holder is rotated from said second position to said first position, said lock mechanism comprising:

a lock member mounted on said one side wall and engaged with said eject lever when said cartridge is inserted into said cartridge holder for restricting said eject lever from moving in said cartridge eject direction, and a releasing member which releases said engagement of said eject lever with said lock member when said cartridge holder is rotated from said second position to said first position.

2. The recording and/or reproducing apparatus as recited in claim 1, wherein said lock member is rotatably mounted to a portion of said one side wall that is adjacent to said rear edge, and said releasing member is rotatably mounted to said base member adjacent to said one side wall.

3. The recording and/or reproducing apparatus as recited in claim 2, further comprising:

a lock pin formed on said eject lever;

a tab portion and an operation member formed on said lock member; and an action tab formed on said release member;

wherein, when said cartridge is inserted into said cartridge holder, said tab portion engages said lock pin to prevent said eject lever from moving in said cartridge ejection direction, and when said cartridge holder is rotated from said first position to said second position, said operation member engages said action tab through rotation of said release member, and when said cartridge holder is rotated from said second position to said first position, said action tab causes said lock member to rotate relative to said cartridge holder thus causing said lock pin to disengage from said tab portion.

\* \* \* \* \*